United States Patent [19]

Pall

[11] 4,021,281
[45] May 3, 1977

[54] CONTINUOUS PRODUCTION OF NONWOVEN TUBULAR WEBS FROM THERMOPLASTIC FIBERS AND PRODUCTS

[75] Inventor: David B. Pall, Roslyn Estates, N.Y.

[73] Assignee: Pall Corporation, Glen Cove, N.Y.

[22] Filed: Nov. 25, 1975

[21] Appl. No.: 635,481

Related U.S. Application Data

[63] Continuation-in-part of Ser. No. 393,688, Aug. 31, 1973, Pat. No. 3,933,557.

[52] U.S. Cl. ............................... 156/167; 156/173; 156/193
[51] Int. Cl.² ......................................... D04H 3/16
[58] Field of Search ........................ 156/193–195, 156/173–175, 167, 425–431, 279

[56] References Cited

UNITED STATES PATENTS

| | | | |
|---|---|---|---|
| 2,886,877 | 5/1959 | Frickert et al. | 156/175 X |
| 3,615,995 | 10/1971 | Buntin | 156/167 X |
| 3,615,998 | 10/1971 | Kolb et al. | 156/167 X |
| 3,781,393 | 12/1973 | Feltgen et al. | 156/167 X |
| 3,796,619 | 3/1974 | Rich | 156/167 |
| 3,801,400 | 3/1972 | Vogt et al. | 156/175 X |

FOREIGN PATENTS OR APPLICATIONS

| | | | |
|---|---|---|---|
| 107,758 | 7/1939 | Australia | 156/167 X |
| 107,759 | 7/1939 | Australia | 156/167 X |

Primary Examiner—David A. Simmons

[57] ABSTRACT

A process is provided for the continuous production of nonwoven webs in the form of a flexible tube from thermoplastic fibers, spinning the fibers continuously from a melt onto a rotating mandrel and continuously withdrawing the web from the mandrel in the form of a flattened tube. Density of the web is controlled by controlling the distance between the rotating mandrel and the orifices of the spinning die through which the molten polymeric material is spun, and by controlling the diameter of the fibers. If the spinning of the fibers is continuous, the flattened tubular web can be formed in a continuous length. Control of the spinning rate in relation to the diameter of the mandrel and the rate of withdrawal of the tubular web from the mandrel controls the thickness of the web. The web drawn off the mandrel can be used as a tube, or slit lengthwise and opened out, or collapsed onto itself, for use as a double layer sheet. The process is particularly adapted for forming filter elements and for forming webs of great width, which would be very costly or impractical to produce using conventional spinning dies of length equal to the width of the web.

9 Claims, 6 Drawing Figures

CONTINUOUS PRODUCTION OF NONWOVEN TUBULAR WEBS FROM THERMOPLASTIC FIBERS AND PRODUCTS

This application is a continuation-in-part of Ser. No. 393,688 filed Aug. 31, 1973, now U.S. Pat. No. 3,933,557 patented Jan. 20, 1976.

Cylindrical filter elements are normally formed of sheet material that is folded over onto itself into a cylindrical configuration, with the lapped edges brought together and sealed in a side seam seal. The sheet can be folded with corrugations to increase the useful area of the filter sheet within a confined space. In forming the seam, usually the two outside surfaces of the ends of the sheet are brought together. One or both of the opposed surfaces is coated with adhesive, and the seal is then formed by application of heat to set the adhesive. A seam is formed in which a layer of adhesive extends from end to end of the seam, and across the seam from the outer surface to the inner surface, and this layer of adhesive is presented endwise to the surface of the filter element. The portion of the filter element bonded to an adhesive layer in the seam is of course not porous, and this reduces the available surface area of the filter.

Various types of sealing techniques and folding of the side edges of the filter sheets at the seal have been proposed, to avoid these problems, but none have been fully successful. Canadian Pat. No. 742,053 issued Sept. 6, 1966 to David B. Pall and Herbert L. Foreman, describes a reversed lapped seam side seal, wherein the outer surfaces of the adjacent sheet portions are brought together in face-to-face relationship with a self-sustaining ribbon of bonding agent therebetween bonding the sheet portions together to form a leakproof seal. However, in this type of seam also, the bonding agent presents an area of nonporous material extending from the inner surface to the outer surface of the filter sheet.

In the manufacture of cylindrical filter elements with ultrafine removal ratings, it is frequently advantageous to use a very thin filter sheet, since a thin sheet presents less resistance to fluid flow than a thick one. Such sheets tend to be fragile, and it is for this reason desirable to reinforce the thin sheet against rupture due to applied pressure in both directions, and against mechanical damage by handling during and after fabrication, by surrounding it with relatively thicker and stronger layers of more open foraminous sheet materials. The resulting multilayer structures with generally tapered or stepped pores are particularly difficult to seal together in a cylindrical form, because an adhesive of sufficiently low viscosity to penetrate the coarse layers tends to be rapidly drawn away by the finer capillarity of the finer layers, with the result that the coarser layers are starved of adhesive, and imperfectly sealed together. For this reason, such seals tend to be very unreliable, and permit passage of solids through the filter elements by edgewise flow through the interposed coarser layers at the seal.

A further difficulty with side-seam-sealed cylindrical filter elements is the bonding of end caps to the open ends of the cylinder. The adhesive systems used to bond the end caps to the ends of the side-sealed pack usually adhere very well to the filter media layers, since these are porous and consequently absorb some of the adhesive, forming a good bond. The same is not true with respect to the layer of adhesive holding the side seam seal together. In many systems, there is zero adhesion between the adhesive system to the end cap and the adhesive in the side seam seal. Consequently, it frequently happens that a poor seal is formed at the adhesive layer, with the result that a leakage path can be formed under fluid pressure across the filter element. Since the adhesive extends from the outer surface to the inner surface of the filter sheet across the seam, the result is a potential bypass route for fluid which does not pass through the filter.

A potential leakage path of this sort cannot be tolerated in cylindrical filter elements in which the filter sheet is of a pore size such that the filter can be used in filtering out microorganisms such as yeasts or bacteria. The development of such a leakage path will result in the organisms bypassing the filter, with possibly harmful consequences.

U.S. Pat. No. 3,801,400 to Vogt, Soehngen and Polise, patented Apr. 2, 1974, describes a process in which polypropylene or other fiber-forming polymer is melt extruded as a continuous molten stream which is attenuated by a plurality of gaseous streams into a fine filament and projected onto a rotating collection surface, such as a mandrel. During collection there is changed, one or more times. at least one of (i) temperature of the filament-forming material, (ii) the speed of extrusion, (iii) the speed of rotation of said collector, (iv) the distance between extruder and collector, or (v) the weight of an idler roll on the collector, thereby to form an annular layer whose density differs relatively from the layer immediately preceding it.

The resulting cylindrical, self-bonded, nonwoven structure has a predetermined, density profile. For uses such as filtration, the fluid to be filtered enters from the low density side so that solids will deposit throughout the filter more or less uniformly rather than building up so much in the firstcontacted layer that it becomes fully clogged before the balance has had any appreciable solids build-up.

The process results in a rigid cylinder, composed of continuous filaments or staple fibers which are wound on the mandrel without disruption or breakage, and have diameters within the range of 0.5 to 50 microns. The density of the cartridge in any given part is less than 50% of the density of the polymer substrate, and is lower at the outer stratum than at the inner, or vice versa, or varies from stratum to stratum, and the diameter of the fibers also varies, presumably due to the varying degrees of attenuation and processing conditions. At the conclusion of the process, the cylinder may be cut to a suitable length.

When the plastic fibers are spun from a spinning die such as described in *Naval Research Laboratory Report No. 111,437*, dated Apr. 15, 1974, entitled "Manufacture of Superfine Organic Fibers", or as described in U.S. Pat. No. 3,825,380, and attenuated from the spinning die using high velocity air jets, very fine fibers of average diameter in the range from about 6 microns down to as low as one-half to one micron, are obtained. When a die of this type is constructed with a continuous array of spinning orifices several inches to several feet long, and the fibers are collected on a foraminous moving belt, the turbulence of the air jets causes the fibers to become intertwined in a very uniform manner, to the extent that a web is formed which is quite strong enough to function well as filters, clothing interliners, wipers, etc. The small diameter of the fibers and the uniformity of their orientation endows the resulting webs with excellent filtration characteristics, very good thermal insulation characteristics, and excellent absorbency for liquids when used as wipers (provided that the plastic used is wetted by the liquid, or is treated so as to be wetted), and similar applications.

For many applications, it is necessary that the web be quite wide. For example, if used as a filter medium in some types of continuously operated equipment, widths of up to 72 or 96 inches are required, and in some applications widths as great as 120 inches are desired. The webs may also be used as surgical dressings and as absorbents for liquids in many applications, as bed liners, and in clothing either directly or as an outer liner. In many of these applications it is very important that the web have a very soft hand (i.e., a high degree of flexibility and soft feel to the touch.) In order to make such wide webs, spinning dies as long as the web width would be required. However, it is extremely difficult, and probably not in practice feasible, to make dies as long as 72 to 120 inches. In these dies the nozzles from which the attenuating air issues are generally 0.009 to 0.015 inch slits continuing for the full length of the die, and in order to obtain fibers under 6 $\mu$ in diameter the geometrical relationship of these air nozzles to the nozzles from which the resin is extruded must be very precise; for example, within 0.002 inch for the full length of the die, as described in U.S. Pat. No. 3,825,380. Further, this accuracy must be maintained even though the die is intermittently heated to about 550° to 650° F and then cooled to room temperature, which tends to cause warpage, especially in very long dies. For these reasons, such dies are very costly to build, and require frequent and costly maintenance. The cost of such a die is approximately proportional to the cube of its length, and in 1975, the cost of a 40 inch die with an estimated life of one to two years was $35,000. The estimated cost of a 72 inch die is over $200,000, and the cost of such a die for replacement and maintenance would far exceed all other costs of manufacturing the web. For this reason, dies longer than 40 inches have never to our knowledge been built, and webs with fibers of 6 microns or smaller average diameter, in widths greater than 40 inches, have to our knowledge never been made, prior to the development of the process of this invention.

Webs made with fibers of diameter in excess of about 6 microns are relatively inflexible, and have a harsh feel. In order to obtain a web with a soft hand, such as to make it suitable for use in articles of clothing, or as a surgical dressing, the fiber diameter should be under 6 microns, and preferably in the 2 to 4 micron range. Webs with fiber diameters under two microns are very soft, but tend to be too weak for many types of service.

Irrespective of the length of the die used, it is a characteristic of this type of die that it is prone to local clogging, probably due to passage of resin gels through the barrier screen provided, and clogging of the fine orifices by these gels. When such local clogging occurs, the product web made by use of a conventional endless belt contains continuous longitudinal areas which are lower in weight per unit area, thinner, weaker and poorer in filtration efficiency, than the remaining portions of the web. Even though the reduction in total resin throughput is small, for example 1%, the die must then be removed, disassembled, and cleaned, a very costly process in terms of labor and lost production time.

Problems due to clogging are substantially alleviated by the process of this invention, in which the web is collected on a rotating mandrel, and continuously withdrawn from the mandrel as a flattened flexible tube. By rotating the mandrel rapidly with respect to the rate of withdrawal, for example such that the pitch of the spiral through which an element of the web travels during manufacture is less than about ¼ to ½ inch, a uniform web is obtained even though a portion of the die is nonoperative; thus production can continue until such time as the proportion of the die which is nonfunctional becomes excessive — e,g, 10% to 30% or more.

In accordance with the invention, a process is privided for forming nonwoven thermoplastic fibrous material is a seamless tubular configuration and in continuous lengths by collecting fibers as they are melt blown from a die directly onto a rotating mandrel, and optionally but not necessarily continuously drawing the resulting fibrous tubular web from the mandrel. Such a tubular web can be made in any diameter, thickness and length desired, of fibers of any diameter from any thermoplastic polymeric fiber-forming material, but preferably the fiber diameter is less than 10 $\mu$. Control of the density and pore size of the web during laydown controls the porosity that is obtained. Such tubular webs are particularly useful as filter elements, whether in tubular or collapsed or slit sheet form, and also may serve in other applications, in many of which the ability to make extraordinarily wide webs at low cost provides an important advantage.

A particular advantage of this method is that it makes possible the laydown of very fine fibers, which are preferred for filter elements having fine pores and a high proportion of open area. Fibers that are less than 10 $\mu$ and can range below 0.5 $\mu$, and particularly in the range of 6$\mu$ to 1$\mu$, can be spun and laid down onto the rotating mandrel.

Nonwoven fabrics, which find application as filters, as well as for many other uses, such as clothing, clothing interliners, thermal insulation, padding, etc., are made by numerous methods in which the fibers are laid on a moving belt. The manufacturing method may start with natural or synthetic fibers which are dispersed in fluids and then delivered to the belt, or the fibers may be made by forming in situ, as for example by mechanically drawing them from bulk via spinnerets, or by attenuating them using compressed air, steam or other fluids, or by spinning into a liquid bath. The fibers may be bonded to each other by virtue of mechanical entanglement, or by virtue of softening all the fibers, or by softening a lower melting portion of the fibers, or by application of thermoplastic or thermosetting resins, or by inorganic bonding agents such as alumina or silica sols.

All these methods are characterised by the following common factors:

a. A band of material at the edge of the web is nonuniform, tapering from full thickness to zero. The "selvedge" must be cut off and discarded, and is a serious cause of loss, especially in narrow webs.

b. To achieve a web of given width, fiber spinning means of width greater than the web must be provided.

c. The fiber diameters are of the order of 10 to 150 $\mu$ and higher.

In accordance with the invention, a process is provided for making webs which are essentially free of waste. Webs of any desired width can be made independently of the width of the fiber spinning means.

Accordingly, the process of the invention comprises spinning molten thermoplastic material in the form of plurality of fibers having a diameter of less than 6 microns and preferably from 2 to 4 microns, and collecting and winding the fibers directly on a rotating mandrel to form thereon a tubular web of randomly oriented heterogeneously interwined spun fibers of the desired depth and density. In one particular form of the invention, molten thermoplastic resin is spun by a multi-orifice die.

As a further feature of the invention, application of a gas blast at the orifices of the spinning die directed generally in the direction of projection of the fibers from the orifices attenuates the fibers to a diameter below 10 microns and disrupts the fibers before or during laydown on the mandrel into discrete lengths. However, any known alternative technique can be used, such as mechanical drawing down or stretching of the soft fibers while they are still plastic.

Uniformity of density of the resulting tube is obtained by spacing the orifices of the spinning die at the same distance from the surface of the rotating mandrel at the point where laydown begins, and the surface of the top layer laid down on the mandrel, and attenuating the fibers before laydown on the mandrel or tube. A spinning die of course has a plurality of such orifices. If the face of the spinning die bearing the orifices is arranged parallel to the outer periphery of the mandrel and the tube laid down thereon, i.e., the collecting surface, all orifices are at the same distance from the mandrel or tube. The result is that no fibers travel over a greater distance to reach the surface than others, before they are collected.

Density of the web is controlled by the distance between the orifices and the mandrel. The shorter the distance the fibers travel between the orifices and the mandrel, or tube, the greater the density of the layer collected therefrom, and vice versa.

A graduated density and pore size can however be obtained if desired by laying down fibers of differing diameters, together but in differing proportions, or in different zones or layers of the tube. Thus, orifices can be used arranged in groups of the same size but in a sequence of different sizes, or in groups of a mixture of sizes but different proportions of the different sizes in succesive groups. Sets of dies can be used in which the attenuation air rate is varied from one part of the die to the other, resulting in greater or smaller density and pore size as desired, depending on location with respect to the inner surface of the collected web. In either case, different diameter fibers are laid down in different zones, and give rise to a different and graded density in such zones.

The process affords an unlimited flexibility in the dimensions and number of orifices as well as the spacing of the orifices in the spinning die. Large size continuous dies such as are required to lay a wide web on a moving belt are difficult to construct, and certain size limitations cannot be practically exceeded, but in the process of this invention, there is no limit on the number and location of the spinning dies. Because each element of the simultaneously rotating and axially translating web is impinged upon equally by every part of each die used, regardless of its location, the dies can be arranged about the mandrel in any spacing and orientation, to provide for a laydown of any desired number of fibers per unit interval. Multiple narrow dies which are easier and less costly to construct can be used, in a number to provide for fabrication of the web at any desired size and rate of production.

Use of multiple spinning dies makes it possible to lay down different fibers in a predetermined sequence, so as to lay down fibers of different softening point, and then further bond them together, or to bond the web to other web or webs by softening the lower softening point fibers, or fibers of different solvent susceptibility, so as to render the surface of one kind tacky by solvent, but not the other, or fibers of different tensile strength, so as to strengthen the tube, or fibers of differing diameter, and so on.

The finished tube of nonwoven fibrous material can be drawn off the mandrel along the longitudinal axis of the mandrel and this can be done continuously as the fibers are being spun, so that the tube is continuously formed at one end of the mandrel, and continuously withdrawn at the other, while the mandrel is rotating. Withdrawal of the tube from the mandrel is facilitated by tapering the mandrel so that it has a larger diameter at the tube-forming end than at the tube-withdrawing end.

It is not necessary to apply a bonding agent or adhestive to hold the fibers in the resulting nonwoven fibrous web together. The fibers become thoroughly entangled during laydown on the mandrel, and are maintained in juxtaposition in the web by virtue of this entanglement. If the fibers are soft and adherent at the time they strike the mandrel, they may become bonded together at their crossing points in the course of windup on the mandrel. The process can however be controlled so that the fibers while molten at the time they emerge from the orifices of the spinning die harden, become solidified, and are nontacky at the time they reach the mandrel and are wound up. Such fibers have their dimensions fixed at the time the tube is formed and better control of the size of the pores is therefore obtained, since the fibers have little or no tendency to become distorted in a random manner during windup.

The seamless flexible tubular web that is obtained can be treated in any desired manner, and cut into selected lengths. The tubular web can be provided with internal or external supports, flow from inside to out, or vice versa with one or both ends open.

As an alternative procedure, however, since the fibrous material is sufficiently flexible, the tube can be flattened, and wound up as a flattened double layer web with the edges held together and therefore nonraveling, from which sections of web can be cut off in the lengths desired. The tube can also be slit longitudinally, and opened out to form a single-layer filter sheet. Both such types of sheets are useful as filter elements. While the tube and web materials of the invention find particular application as filter elements, they are useful generally in the manner of nonwoven fibrous webs, as insulation, liners or interliners in building construction, packaging materials, clothing, refrigeration and heating systems, carpeting and other floor coverings, engine housing for machinery, automobiles, trucks and buses, farm equipment and machine tools, to mention only a few examples.

Thus, a special feature of the invention is the provision of a seamless flexible fibrous tube, which can be in cylindrical or sheet form, or indeed any other configuration obtainable by shaping these two basic forms, comprising a layer of randomly oriented heterogeneously interwined melt-blown fibers less than 6 $\mu$ and preferably less than 4 $\mu$ in diameter, of any desired depth and density, and having a voids volume of at least 70% and preferably at least 85%.

Preferred embodiments of the process and products of the invention are shown in the flow sheets of the drawings, in which.

The process of the invention is applicable to any thermoplastic resinous material that can be spun through the orifices of a spinning die or spinnerette to form fibers that are self-supporting. Exemplary thermoplastic materials include polyamides, polyacrylonitrile, linear polyesters such as esters of ethylene glycol and terephthalic acid, and of 1,4-butane diol and dimethyl terephthalic acid or terephthalic acid, polyvinylidene chloride, polyvinyl chloride, copolymers of vinyl chloride and vinyl acetate, polyvinyl butyral, polyvinyl acetate, polystyrene, linear polyurethane resins, polypropylene, polyethylene, polysulfone, polymethylpentene, polycarbonate, and polyisobutylene. Also within this category are thermoplastic cellulose derivatives, such as cellulose acetate, cellulose propionate, cellulose acetate-propionate, cellulose acetate-butyrate and cellulose butyrate. Nonresinous materials such as glass can be similarly processed.

The process utilizes fine fibers. Coarse fibers have diameters from 10 $\mu$ to 50 or 100 $\mu$ or higher. Fine fibers have diameters below 6 $\mu$ and preferably below 4 $\mu$, down to 0.5 $\mu$ or less. Fine filaments give a flexible nonwoven web having a finer pore size, and a soft hand, while coarse filaments generally give a less flexible nonwoven web having a larger pore size and a harsh hand. Fine filaments have better thermal insulation characteristics, and a soft hand even when relatively thick, and are therefore useful as clothing interliners and for other thermal insulation applications.

Any conventional spinning die or spinnerette can be used. Such dies are available and well known in the fiber-spinning art, and form no part of the instant invention. The term "spinning die" will be understood to include spinning nozzles; spinnerettes; reservoirs faced with a plate including a plurality of orifices in any desired size and pattern; and centrifuges or rotors having a plurality of orifices about their periphery, through which the fibers are spun by centrifugal force. Fiberizers, rotating wheels and discs, and like materials are also included.

Figure 2:
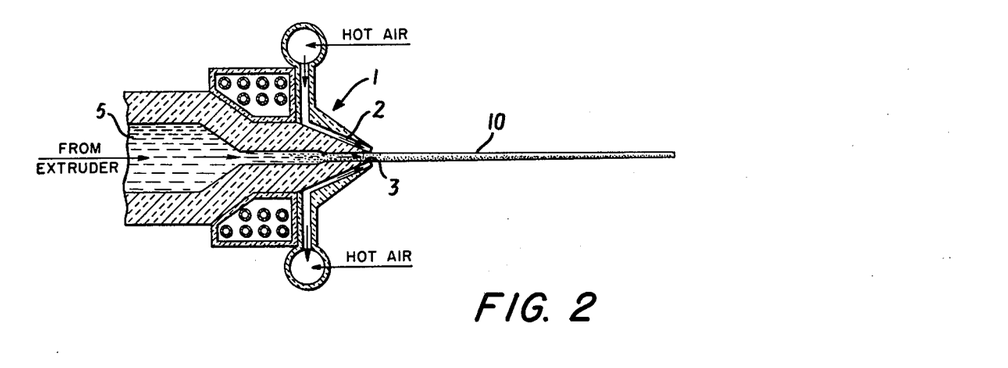
FIG. 2 shows in longitudinal section one orifice of the spinning die of FIG. 1, having an array of orifices embraced by nozzles for directing a gaseous blast for attenuating and disrupting the molten filaments spun through the orifices.
Figure 3:
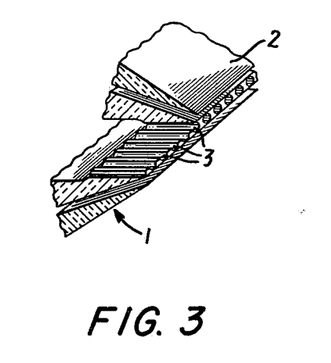
FIG. 3 shows in perspective the spinning die of FIG. 2.

A preferred type of spinning die has openings arranged circumferentially about the individual orifices, or array thereof, adapted to discharge a gas at high but controlled velocity along the central axis of the orifice. The gaseous blast attenuates the fibers, and tends to disrupt them so that they are broken up into discrete lengths, which can be adjusted according to the velocity and volume of the gaseous blast. If a centrifugal rotor is used, the openings for discharge of the gaseous blast can annularly surround the rotor. If a plurality of spinning orifices or nozzles are used, the blast can be emitted from jets arranged about the circumference of the individual jets or nozzles. In the case of a spinning die with a plurality of orifices in a plate, the blast can be emitted at the periphery of the spinning die. A typical arrangement is shown in FIGS. 2 and 3, where a spinning nozzle is illustrated.

The gaseous blast can be heated, so as to retard the cooling of the fibers. The gaseous blast can also be a cold blast, to accelerate the cooling of the fibers, and thereby their rate of solidification. Thus, by the use of the gaseous blast the time interval during which the fibers harden and solidify can be controlled. If the fibers are kept hot longer, the attenuation is increased, and if the fibers are cooled more rapidly, the attenuation is decreased. Thus, in this way some control over the length of the fibers is also obtained.

The polymeric material of which the fibers are spun is maintained in molten condition at the time of spinning. The temperature of the melt is adjusted to obtain a molten material of the desired viscosity at the time the material emerges from the orifice. This also gives some control over the degree of attenuation and the lengths of the fibers, since a more viscous material tends to be more cohesive and less attenuated by the gaseous blast and since it is generally at a lower temperature, will also cool more quickly and therefore solidify in a shorter time, yielding a relatively larger diameter fiber.

The distance between the orifices of the spinning die from the rotating mandrel is controlled so that by the time the fibers reach the mandrel they have cooled sufficiently so as to be shape-retaining. They may still be soft, and therefore adhesive, so that they tend to stick together at their crossing points. They may also be fully solidified, so that they do not adhere to one another, in which condition they retain their shape better. They are collected in a randomly oriented heterogeneous interwined arrangement on the mandrel, since virtually no control is exercised over the path the fibers follow in their trajectory from the spinning die to the mandrel. By the time the fibers reach the mandrel, they are either already broken up or disrupted into discontinuous lengths, or they are still attached to the orifice from which they are spun by a portion which is molten. In the latter case, the fiber is continuous.

The attenuating air issues at just below sonic velocity, which is very much greater than the peripheral velocity of the collecting mandrel; hence there is very little attenuation of the fibers by the rotating motion of the mandrel. Mechanical attenuation cannot in fact produce the fine fibers of the invention, and is not employed in the process of the invention.

The fibrous material collected on a rotating mandrel tends to be laminar in form, the material collected during each successive rotation forming a single lap or layer. If the distance from the die to the mandrel or tube collecting surface is small, 3 inches to about 6 inches, the fibers in the adjacent layers become firmly entangled, such that it becomes difficult or impossible to dintinguish or separate the layers. If the die-to-collecting-surface distance is relatively large, 12 inches to 18 inches, the layers can be separated from each other but adhesion is sufficient to permit the product to be very useful in many filtration applications. The thickness of each layer in the lapped web obtained depends upon the rate of the rotation of the mandrel, which from a practical point of view is not critical between wide ranges. As a rule, it is desirable for the mandrel to rotate at a rate such that each portion of the collected tubular web contains ten to twenty or more layers, but webs with only one or two layers can be made.

If the distance from the orifices of the spinning die to the tubular collecting surface is relatively large, and the spacing of the orifices relatively coarse, there may be "roping" (intertwining or spiral twisting of filaments to produce a heavy yarn or rope) of the filaments from adjacent orifices before laydown. Some "roping" can be tolerated without a materially harmful change in the characteristics of the tube. As "roping" increases, however, the tube begins to acquire the characteristics of a "honeycomb" tube, which may be undesirable.

In general, at a distance of from 3 to 4 inches, there is no "roping", while at a distance above 12 inches "roping" becomes severe. Over the intervening distances, from 4 inches to 12 inches, "roping" appears and becomes increasingly severe. The distance can thus be adjusted as required to avoid or control the amount of "roping".

For liquids filtration, uniformity of laydown is important, and the distance is thus preferably from 3 to 5 inches. For gas filtration, it is desirable to obtain high voids volume in order to reduce pressure drop across the nonwoven web, and the distance is thus preferably from 7 to 10 inches to obtain a lower density laydown with a small proportion of "roped" filaments.

Another way of controlling "roping" is to increase the spacing of the orifices of the spinning die. In a conventional spinning die, the orifices are rather close together, and a spacing of 20 to 50 orifices per linear inch is standard. This spacing gives severe "roping" at distances over 12 inches.

On the other hand, an increase of the spacing to from ten orifices per linear inch down to one orifice per linear inch virtually precludes, if it does not eliminate, "roping". While this increase the size and length of the spinning die or dies, and would result in striations in the machine direction in the conventional system, this is perfectly acceptable in the process of the invention.

By placing the spinning die or die combination so that all orifices thereof are at the same distance from the outer periphery of the rotating mandrel, or tube laid down thereon, i.e., the collecting surface, the attenuating the fibers before laydown, using a gaseous blast or other attenuating means, it is possible to obtain a uniform density of the mat or web on the mandrel. The distance between the orifice and the collecting surface determines the density of the mat; the shorter the distance, the higher the mat density. Accordingly, by varying the distance, but keeping the spinning die parallel to the collecting surface, in the manner shown in the Figures, the density in the resulting mat is easily controlled.

Cylindrical webs or tubes can be formed in a continuous manner.

The tube formed on the mandrel is continuously withdrawn from the mandrel; in this manner, tubes of any desired length can be made.

Thickness of the web laid down on the mandrel is adjusted by the diameter of the mandrel, the rate at which the fibers are extruded, the density of the collected fibrous structure, and the rate at which the tubular web is withdrawn from the laydown zone.

Figure 1:
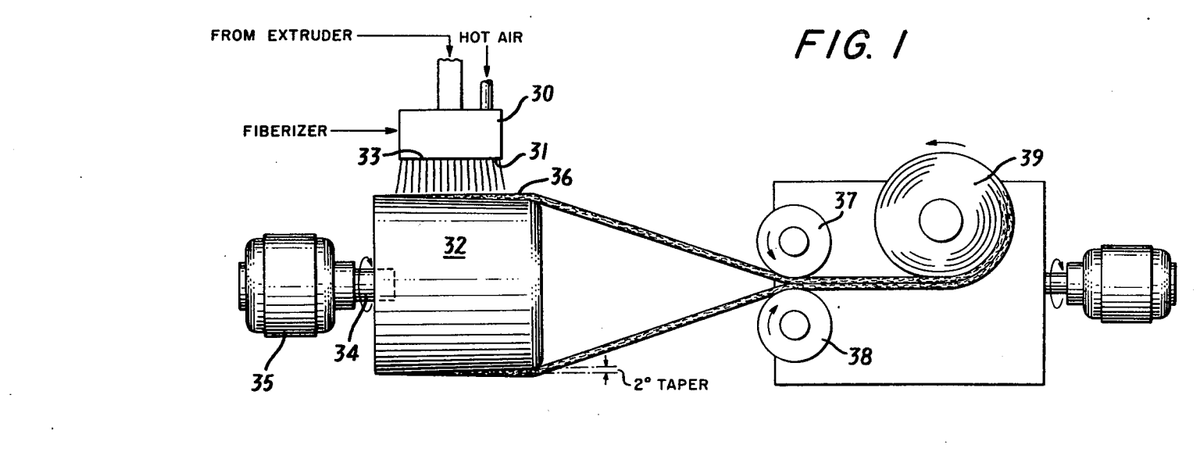
FIG. 1 represents an embodiment of the process of the invention in which a tube of relatively flexible fibrous material is flattened after being drawn off from the mandrel to form a bilayered web material, and then rolled up.

The rotating mandrel on which the mat is laid down can be rotated in a fixed position, and the finished tubular web is drawn off the end of the mandrel, and rolled up in a flattened state, as shown in FIG. 1. To facilitate slipping off of the tubular web from the mandrel, the mandrel can be tapered, so as to diminish in diameter towards the end at which the web is drawn off.

When making relatively thicker wall tubes, for example with wall thickness in excess of ¼ inch to ½ inch, the fibers may become softened due to the extended exposure to the impinging flow of hot gas. This is particularly the case where the die to mandrel distance is small, for example less than 4 inches to 7 inches. In order to avoid the consequent densification and shrinkage, it is often desirable to introduce cooling, which can be accomplished by various means, for example by internally cooling the collecting mandrel, as by flowing cold water through it, or by cooling the fibrous mass by blowing cold or room temperature air at and through it from the side opposite the die, or by blowing cold air through an appropriately perforated mandrel.

After the tubular web is drawn off from the mandrel and flattened, it can be further processed in various ways. It can for example be impregnated with a resin binder or impregnated to obtain a more rigid structure, or to reduce porosity. Additives can also be added thereto. For instance, if the flattened tube is to be used as a filter for water treatment purposes, it can be impregnated with a bactericide, or fungicide, or other water-treating material which is to be dissolved in the water passed through it.

Additives can also be incorporated by feeding them into the stream of fibers from the spinning die orifices before laydown. Such additives can include activated carbon, diatomaceous earth, glass or other organic or inorganic fibers, surface-active agents, fillers such as silicone resins, polytetrafluroethylene, hydrophobic silica, and similar agents, and binder resins in liquid droplets or solid form.

The flattened tubular web can be cut into lengths, and processed further to form a tubular filter element. This may include folding into a cylindrical or the closed configuration, and the application of internal core and external sheath supports, and end caps to each open end of the tube, sealing the end caps of the tube, core and sheath using an adhesive. The end caps will be shaped so as to fit within the filter assembly in which the resulting filter element is to be used.

The process of the invention is particularly adapted to form flattened tubular single or double-layered sheets having the characteristics of nonwoven fibrous webs in continuous lengths and considerable widths, useful as filters and for many other applications. The width of such a sheet is determined by the diameter of the rotating mandrel. A double-layered sheet can be formed simply by collapsing the tube drawn off the mandrel, and a single-layered sheet can be obtained by slitting one side of this tube and opening it out, so that the resulting sheet has a width equal to the circumference of the mandrel. The sheet can also be cut into any desired widths less than this circumference.

The apparatus shown in FIGS. 1 to 3 includes a spinning die 30 whose face 31 has an array of orifices 33. However, it is not necessary that they be uniform. By varying the size of the orifices on the die from leading to trailing end of the die, graded density tubular webs are obtained (see FIGS. 2 and 3). The spinning die is supplied with molten thermoplastic polymeric material such as polypropylene from a reservoir, which is fed by the inlet line 5 carrying molten thermoplastic polymeric material from an extruder or other source of supply (not shown) under a pressure sufficient to project the material through the orifices of the die, thereby forming a plurality of molten fibers 10.

The fibers traverse a short air space, in the course of which they are attenuated by a stream of air issuing from orifices 3 and solidify, and are collected on a tapered rotating mandrel 32, one end of which is held to the shaft 34 of an electric motor 35, which is arranged to rotate the mandrel at a relatively slow speed, approximatey 3 to 5 surface feet per second in this instance. The fibers are randomly oriented and heterogeneously intertwined as they are wound up on the mandrel, forming a tubular web of nonwoven fibrous material 36.

The spinning die is set in parallel to the collecting surface, i.e., the mandrel or tube laid down thereon, so that the orifices are all at the same distance from the collecting surface. The result is that all fibers have the same distance to travel before they reach the collecting surface. Consequently, if the die orifices are uniform, no portion of the nonwoven fibrous mat formed of fibers laid down from the orifices at the end has a higher density than any other portion.

The tube 36 as it is being formed is drawn continuously to the right and is flattened as it is withdrawn from the mandrel by the flattening rollers 37, 38, and then rolled up to form a spiral roll 39. The result is a double-layered sheet of nonwoven fibrous material, the side ends of which are nonravelling because they are interconnected in collapsed tubular form. This is consequently a very coherent filter sheet of nonwoven material, whose fibers are nonmigrating.

A sheet double this width can be obtained by slitting the tube along one side, imposing a cutting knife between the end of the mandrel and the flattening rolls, which in this modification would be drawn off and opened up so that it would be spread out to form a one layered sheet, double the width of the flattened tube. The opened-out sheet would then be wound up, in the manner shown in FIG. 1.

Figure 4:
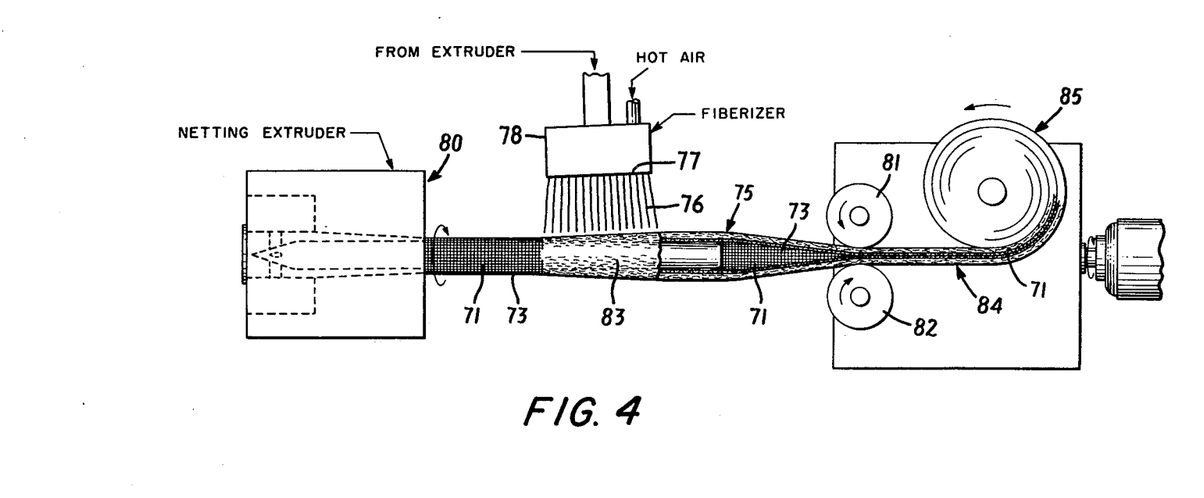
FIG. 4 represents another embodiment in which a tube is laid down on a tubular foraminous netting that is preformed by an extrusion or other forming process and itself serves as a permanent core for the resulting flattened filter element.

In the processing system shown in FIG. 4, the preformed mandrel 71 is an extruded netting from extruder 80, and this also forms the core of the resulting filter element, which is drawn off and flattened with the core within as a foraminous spacer, as shown in FIG. 4.

The mandrel 71 is extruded in the form of a netting, in a diagonal open mesh of thermoplastic polymeric material. Since in manufacture the netting is extruded continuously, it can be in quite long lengths. The netting is in tubular form with a plurality of apertures 73 for passage of fluid therethrough into the central open passage thereof. The netting 71 is supported on mandrel 83 which is supported at its far end on the core of the extrusion die 80. The netting 71 moves continuously into position to receive the fibers 76 spun from the orifices 77 of spinning die 78.

As the extrudable polymeric material, there can be used not only any of the thermoplastic metting materials used in forming the fibers, but also, in addition, materials such as polycarbonates, polyoxymethylene, polytetrafluoroethylene, polychlorotrifluoroethylene, phenol-formaldehyde, urea-formaldehyde, melamine-formaldehyde, epoxy and polyvinyl fluoride polymers.

The fibers 76 are spun onto this mandrel 71 in the same manner as in FIG. 1, and the composite core-plus-filter element 75 formed thereon is drawn forward and flattened by rollers 81, 82 and the resulting bilayered sheet 84 with internal bilayered netting 71 is then wound up on storage roll 85.

Figure 5:
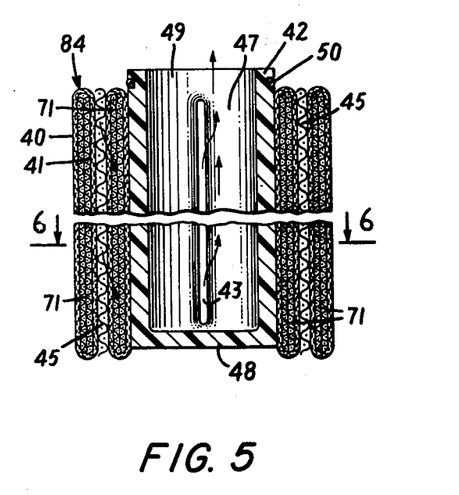
FIG. 5 represents in longitudinal section a flattened spirally wound filter element prepared by the process of FIG. 4, made into a filter cartridge supported on an internal core.
Figure 6:
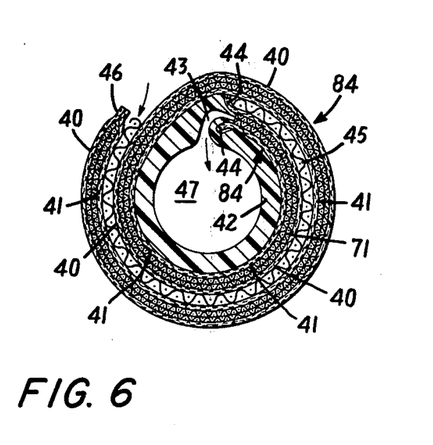
FIG. 6 represents a cross-sectional view taken along the line 6—6 of the filter cartridge shown in FIG. 5.

FIGS. 5 and 6 show a spirally wound filter element made of the double-layered collapsed tubular sheet material 84, 71 that is obtained using the system of FIG. 4. The tube has two layers 40 and 41 which are attached together at their edges because of the tubular nature of the sheet.

The double-layered tubular sheet 84 is spirally wound on a cylindrical core 42 provided with a longitudinal slot 43. One end 44 of the tube 84 is attached to the slot, and the tubing is then rolled several turns around the core, interleaved with another strip 45 of netting which serves as an external spacer for fluid flow. The internal netting 71 serves as an internal spacer for fluid flow. The outer end 46 of the tubular sheet is sealed. Fluid passes edgewise along the interleaved external strip 45, thence through the tube walls 40, 41, into the exterior of the tube 84 along the netting 71 into the core 43 and thus into the open interior 47 of core 42, which is closed at one end 48 so that all the fluid is delivered through the aperture 49 at the other end. The core has an O-ring seal 50 for sealing attachment to a filter assembly (not shown).

In an alternative configuration, stips of flat tubular web with the internal tube of flat tubular netting can be closed at one end, and the other attached to a tube sheet, by means of which a multiplicity of such tubes are connected to a single outlet, forming a large area "parallel plate" filter.

The following Examples in the opinion of the inventor represent preferred embodiments of the invention.

EXAMPLE 1.

Using the system of FIG. 1, and a tapered mandrel having a diameter of 3.94 inches at the larger end, polypropylene polymer was spun at 620° F at a rate of 11 pounds per hour onto the rotating mandrel. Temperature of the attenuating air was 630° F. The tubular web was drawn off the mandrel and flattened before wind-up. The resulting flattened tubular webs were 5.7 inches wide, and when slit and opened out were 11.5 inches wide, although the diameter of the die used was only 10 inches. The sheets were quite strong and very flexible, with apparent complete recovery after numerous foldings. The average pore diameter was 3.5 microns, and the web had a soft hand. Various tests were run on these sheets, with the results shown in Table I. These sheets have many uses as filter media, both in tubular and slit form, and in addition are useful as thermal and electrical insulation, as clothing, interliners for disposable clean room and hospital garments, as battery separators, and for other purposes.

TABLE I

| | CONTINUOUS FLEXIBLE TUBULAR POLYPROPYLENE WEBS | | | | | | | | | |
|---|---|---|---|---|---|---|---|---|---|---|
| | Die to mandrel distance | | Polymer flow rate lbs/hr | Air pressure psi | Mandrel speed rpm | Thickness inch | Weight per sq. ft. grams | Max particle passed μm | Pressure drop at 28 fpm air in w.c.[1] | Voids volume % |
| Run No. | Forming end | Pull Off end | | | | | | | | |
| 1 | 8 | 9 | 11 | 12 | 170 | 0.015 | 4.6 | 25 | 0.2 | 86 |
| 2 | 5 | 5 | 11 | 13 | 263 | 0.020 | 6.7 | 22 | 0.4 | 84 |
| 3 | 5 | 5 | 11 | 12 | 263 | 0.024 | 8.3 | 19 | 0.65 | 84 |
| 4 | 5 | 5 | 11 | 12 | 218 | 0.040 | 11.4 | 14 | 0.9 | 87 |
| 5 | 6 | 6 | 11 | 12 | 170 | 0.045 | 14.5 | 9 | 1.15 | 85 |
| 6 | 6 | 6 | 11 | 12 | 170 | 0.058 | 18 | 8 | 1.20 | 84 |

[1]inches water column.

EXAMPLE 2

Using the system of FIG. 4, a mandrel of polypropylene netting is extruded, having an open mesh rigid structure with diamond shaped openings approximately 0.12 × 01.12 inch. This netting has an inside diameter of 1 inch and an outside diameter of 1.25 inches. Polypropylene polymer is spun at 625° F at a rate of 11 pounds per hour onto this mandrel which is rotating at 135 rpm. The filter tube of polypropylene fibers is 2.00 inches outside diameter. The composite filter tube on the mandrel as a core is drawn forward at a rate of 2 ½ feet per minute, and cut into lengths of 9 ⅝ inches, which are then end-capped to produce the filter cartridges shown in FIGS. 5 and 6. These are useful to filter both gases and liquids.

Preferred types of spinning dies are described in (1) the report *Manufacture of Superfine Organic Fiber*, U.S. Department of Commerce, Office of Technical Services, from the Naval Research Laboratory, (2) the article by Van A. Wente, *Ind j Eng. Chem.*, Vol 48, No. 8, pp. 1342–1346, August, 1956, and (3) the report *An Improved Device for the Formation of Superfine Thermoplastic Fibers* by Lawrence, Lucas & Young, U.S. Naval Research Laboratory, Feb. 11, 1959, the disclosures of which three reports are hereby incorporated by reference. One type of spinning die of these reports has been illustrated in FIGS. 2 and 3.

Having regard to the foregoing disclosure, the following is claimed as the inventive and patentable embodiments thereof:

1. A process for forming flexible nonwoven webs of thermoplastic fibrous material in a seamless tubular configuration and in continuous lengths, which comprises spinning molten thermoplastic material in the form of a plurality of fibers from a spinning die having a plurality of orifices spaced equidistantly from a collecting surface on the exterior of a rotating mandrel; applying a gas blast at the orifices of the spinning die directed generally in the direction of projection of the fibers from the orifices, attenuating and disrupting the fibers into discrete lengths of a diameter below 6 μ; and collecting and winding the fibers directly on the collecting surface to form thereon a nonwoven flexible tubular web of randomly oriented heterogeneously intertwined spun fibers, withdrawing the flexible tube of nonwoven fibrous material from the mandrel; and flattening the tube to form a double layer web with the edges held together and therefore nonravelling.

2. A process according to claim 1, in which the tube of nonwoven fibrous material is drawn off the mandrel along the longitudinal axis of the mandrel.

3. A process according to claim 2, in which the tube is drawn off the mandrel continuously as the fibers are being spun, so that the tube is continuously formed at one end of the mandrel, and continuously withdrawn at the other, while the mandrel is rotating.

4. A process according to claim 1, in which the fibers are soft and adherent at the time they strike collecting surface, and become bonded together at their crossing points in due course of windup on the collecting surface.

5. A process according to claim 1, in which the fibers become solidified, and are non-tacky at the time they reach the collecting surface and are wound up.

6. A process according to claim 1, in which the seamless tube that is obtained is cut into selected lengths.

7. A process according to claim 6, in which the flattened tube is placed on an internal support following withdrawal from the mandrel.

8. A process according to claim 7, in which the flattened lengths are formed into filter cartridges by folding into cylindrical configuration, sealing the side seam, and applying internal and/or external supports and end caps.

9. A process according to claim 1, in which the flexible tubular web after being withdrawn is slit longitudinally, and opened out to form a single-layer sheet.

* * * * *

UNITED STATES PATENT OFFICE
CERTIFICATE OF CORRECTION

Patent No. 4,021,281                    Dated May 3, 1977

Inventor(s) David B. Pall

It is certified that error appears in the above-identified patent and that said Letters Patent are hereby corrected as shown below:

Column 4, line 12 : "e, g," should be --e.g.--
Column 4, line 13 : "privided" should be --provided--
Column 5, line 46 : "succesive" --successive--
Column 9, line 3 : "dintinguish" should be --distinguish--
Column 9, line 56 : last "the" should be --and--
Column 10, line 46 : "polytetrafluroethylene -- should be --polytetrafluoroethylene--
Column 12, line 4 : "metting" should be --netting--
Column 13, line 19 : "01.12" should be --0.12 inch--
Column 13, line 34 : "J" should be --&--.

Signed and Sealed this

Eighth Day of November 1977

[SEAL]

Attest:

RUTH C. MASON
Attesting Officer

LUTRELLE F. PARKER
Acting Commissioner of Patents and Trademarks